United States Patent Office 3,399,204
Patented Aug. 27, 1968

3,399,204
2-(HETEROCYCLIC AMINOALKYL)-CYCLIC KETONE-2 CARBOXYLIC ACID BENZYL ESTERS
Albert Frank, Kundl, Tyrol, Alfred Kraushaar, Kufstein, Tyrol, and Hans Margreiter, Radfeld, Tyrol, Austria, and Roland Schunk, Rossdorf, near Darmstadt, Germany, assignors to Biochemie Gesellschaft mit beschraenkter Haftung, Tyrol, Austria, a corporation of Austria
No Drawing. Filed Dec. 29, 1964, Ser. No. 422,028
Claims priority, application Austria, Jan. 13, 1964, A 232/64
5 Claims. (Cl. 260—294.3)

ABSTRACT OF THE DISCLOSURE

Certain basically substituted cycloalkanone-2-carboxylic acid esters are disclosed which have a pronounced pectoral and antitussive activity. Examples of such compounds are 2-(β-piperidinoethyl)-cyclodecanone-2-carboxylic acid benzyl ester hydrochloride and 1-oxo-2-(β-piperidinoethyl)-1,2,3,4-tetrahydronaphthalene-2-carboxylic acid benzyl ester. The products are prepared by reacting a cyclic ketone-2-carboxylic acid ester with an alkali metal oxide or related compound and a haloalkyl amine.

---

The present invention relates to new basically substituted cycloalkanone carboxylic acid esters and their acid addition salts and more particularly to basically substituted cycloalkanone-2-carboxylic acid esters which have a pronounced pectoral and antitussive activity, and to a process of making and using same.

It is one object of the present invention to provide valuable pectoral compositions, which have proved of value as antitussive and pectoral agents.

Another object of the present invention is to provide a process of using such compositions in therapy as antitussive and pectoral agents.

A further object of the present invention is to provide new basically substituted cycloalkanone-2-carboxylic acid esters of surprisingly high antitussive activity.

Still another object of the present invention is to provide a simple and effective process of producing such new basically substituted cycloalkanone-2-carboxylic acid esters.

Other objects of the present invention and advantageous features thereof will become apparent as the description proceeds.

The basically substituted cycloalkanone-2-carboxylic acid esters according to the present invention correspond to the following Formula I:

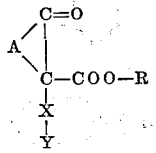

I wherein A is a member selected from the group consisting of an alkylene radical containing more than 4 carbon atoms, a substituted alkylene radical containing more than 4 carbon atoms, a substituted alkylene radical containing 3 carbon atoms in the alkylene chain, and a substituted alkylene radical containing 4 carbon atoms in the alkylene chain, X is a member selected from the group consisting of an ethylene radical, a propylene radical, a substituted ethylene radical and a substituted propylene radical, Y is a member selected from the group consisting of a dialkyl-amino group and a nitrogen-containing heterocyclic ring with 5 to 10 atoms in its heterocyclic ring, the hetero-nitrogen atom of which is attached to the substituent X, and R is a member selected from the group consisting of alkyl, substituted alkyl, aralkyl, and substituted aralkyl, e.g. alkyl or aralkyl, substituted with 1 or more alkyl or alkoxy radicals or halogen atoms.

Preferably A is a substituted or unsubstituted alkylene radical which contains more than 5 carbon atoms and especially 6 to 14 carbon atoms in the alkylene chain. In particular the substituents of A may join, possibly with the inclusion of at least one of the carbon atoms of the alkylene chain, to form a ring, for example an anellated benzene or spirane ring. Examples of substituted alkylene radicals include alkylene radicals substituted with cyclohexene, cyclopentane, cyclohexane, or one or more alkyl radicals.

Y preferably contains a tertiary substituted nitrogen atom, the nitrogen being attached to X. For example Y may be a dialkylamino radical or a substituted or unsubstituted heterocyclic radical, preferably saturated and eventually substituted, such as a pyrrolidino-, piperidino-, morpholino-, tetrahydropyridino-, hexamethyleneimino- or decahydroquinolino radical.

R is preferably a benzyl radical.

These new compounds and their acid addition salts possess a pronounced pectoral and antitussive activity. Said antitussive activity is at least comparable to and in many instances even superior to that of the best known cough remedies.

The compounds according to Formula I are produced, for instance by reacting cycloalkanone-2-carboxylic acid esters of the general Formula II:

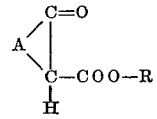

II wherein A and R have the above specified meanings, in the form of their alkali metal compounds, particularly sodium compounds, with haloalkylamines of the general Formula III:

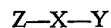

Z—X—Y III wherein Z is a halogen atom, particularly chlorine, and X and Y have the above specified meanings, or respectively, in the presence of a condensing agent particularly sodium oxide, or, for example sodium hydride, sodium amide, sodium metal, phenyl sodium. The resultant compounds of general Formula I may be converted, if desired, into their salts or the bases may be set free from said salts.

The process is conveniently performed in an inert solvent. In a preferred method of operation the reaction is carried out in an inert solvent at temperatures in the range of about 60 to about 140° C., especially at about 80° C. Preferably the inert solvent should have a boiling point in the mentioned temperature range. Examples of solvents, which may particularly be used are benzene or one of its homologues.

The following examples serve to illustrate the present invention without, however, limiting the same thereto.

Example 1

0.1 mol (26 g.) of cyclooctanone-2-carboxylic acid benzyl ester (B.P.$_{.3}$=191 to 193° C.) is added dropwise to a boiling suspension of 0.05 mol of Na$_2$O in 200 ml. of benzene, whilst the suspension is kept well stirred, at a rate permitting the water which forms in salification to be continuously removed by the distilling benzene. The evaporated benzene is periodically replaced by the addition of more benzene. As soon as the water of reaction has been removed 0.1 mol (14.7 g.) of β-piperidinoethyl chloride (B.P.$_{.11}$=71° C.) is added dropwise in the course of 30 minutes, half the benzene is distilled off and boiling is continued under reflux for 8 hours. In order to isolate the reaction product the mixture is extracted with dilute hydrochloric acid, the benzene phase is separated off and the aqueous phase together with the oily precipitate of the hydrochloride of the base is heated to 70° C. at a pH of 2 for 30 minutes whilst the mixture is stirred. After the mixture has cooled neutral cleavage products are extracted with benzene, dilute NaOH is added to the aqueous phase and the base is extracted with benzene. The benzene solution is washed with water, the benzene distilled off and the product heated in vacuo (180° C., 1 mm. Hg) for the removal of easily volatile basic constituents. 25 g. (i.e. 67.5% of theory) of the 2-(β-piperidinoethyl)-cyclooctanone-2-benzylcarboxylate are obtained. This benzylcarboxylate may be further purified by transformation into the hydrochloride, which may be recrystallized from an alcohol/ether mixture. Colourless crystals are obtained which dissolve in water and alcohol. M.P. 158–159° C.

*Analysis.*—C$_{23}$H$_{34}$O$_3$NCl: Calculated: C, 67.71%; H, 8.40%. Found: C, 67.66%; H, 8.65%.

Example 2

From 0.05 mol of Na$_2$O and 0.1 mol (28.8 g.) of cyclodecanone benzylcarboxylate (B.P.$_{.1}$=175–177° C.) the sodium salt is prepared, as described in Example 1, and to the boiling solution of the sodium salt 0.1 mol of β-piperidinoethyl chloride is added dropwise in the course of 10 minutes. Half the benzene is then distilled off and the mixture is refluxed for 8 hours. After having cooled the reaction mixture is shaken with dilute hydrochloric acid, the organic phase being separated and again washed with dilute HCl. The benzene phase which contains the hydrochloride of the base is then filtered, the benzene is then distilled off, water is added to the residue and the latter is stirred at pH 2 for 30 minutes at 70° C. This is then extracted with benzene, the extract being washed with water and the benzene distilled off. The remaining hydrochloride of 2-(β-piperidinoethyl)-cyclodecanone-2-benzylcarboxylate is further purified by recrystallization from an alcohol/ether mixture. Colourless crystals are obtained, which dissolve in water and alcohol. M.P.= 139–140° C.

*Analysis.*—C$_{25}$H$_{38}$O$_3$NCl; Calculated: C, 68.86%; H, 8.79%. Found: C, 69.01%; H, 8.88%.

In a manner analogous to that described in Examples 1 and 2 the following compounds can be obtained:

| Final Product | Prepared from—<br>(a) keto-ester component<br>(b) haloalkylamine |
|---|---|
| 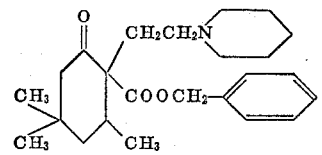 | (a) 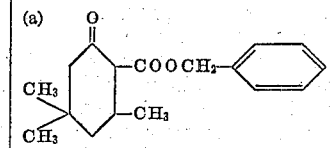<br>B.P.$_{.2}$=164–168° C.<br>(b) ClCH$_2$CH$_2$N⟨⟩<br>B.P.$_{.11}$=71° C. |
| Final product isolated as oxalate. Yield, 18%.<br>M.P.=230–234° C. (decomposition).<br>Summary formula C$_{28}$H$_{37}$O$_7$N:<br>Calculated: C=65.66%; H=7.84%.<br>Found: C=65.56%; H=7.81%. | |
| 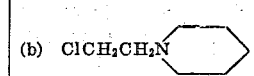 | (a) 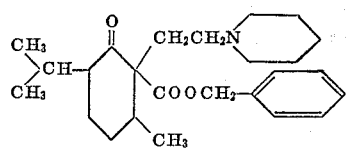<br>B.P.$_{.2}$=163–165° C.<br>(b) ClCH$_2$CH$_2$N⟨⟩<br>B.P.$_{.11}$=71° C. |
| Final product isolated as oxalate. Yield, 31%.<br>M.P.=129–141° C. (decomp.).<br>Summary formula C$_{27}$H$_{39}$O$_7$N:<br>Calculated: C=66.23%; H=8.03%.<br>Found: C=65.79%; H=8.04%. | |

| Final Product | Prepared from—<br>(a) keto-ester component<br>(b) haloalkylamine |
|---|---|
| 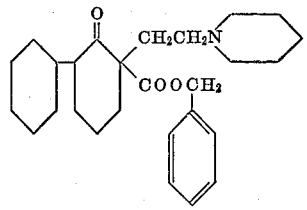 | (a) 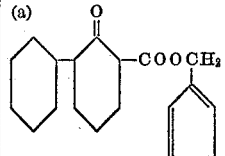<br>B.P.$_{.1}$=205–207° C.<br>(b) 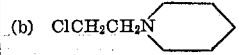<br>B.P.$_{.11}$=71° C. |

Final product isolated as hydrochloride. Yield, 48%.
M.P.=172–174° C. (decomp.).
Summary formula $C_{27}H_{40}O_3NCl$:
    Calculated: C=70.18%; H=8.72%.
    Found: C=70.56%; H=9.00%.

| | |
|---|---|
| 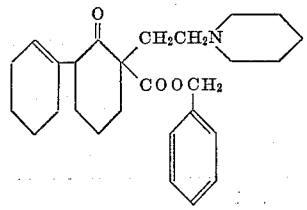 | (a) 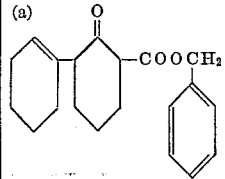<br>B.P.$_{.1}$=203–205° C.<br>(b) 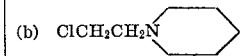<br>B.P.$_{.11}$=71° C. |

Final product isolated as hydrochloride. Yield, 10%.
M.P.=160–166° C. (decomp.).
Summary formula $C_{27}H_{38}O_3NCl$:
    Calculated: C=70.49%; H=8.33%.
    Found: C=70.57%; H=8.42%.

| | |
|---|---|
| 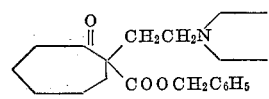 | (a) 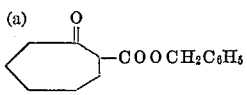<br>B.P.$_{.1}$=164–166° C.<br>(b) 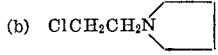<br>B.P.$_{.10}$=56° C. |

Final product isolated as hydrochloride. Yield, 50%.
M.P.=136–137° C.
Summary formula $C_{21}H_{30}O_3NCl$:
    Calculated: C=66.39%; H=7.96%.
    Found: C=66.62%; H=8.04%.

| | |
|---|---|
| 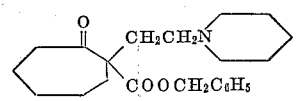 | (a) 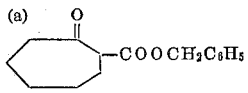<br>B.P.$_{.1}$=164–166° C.<br>(b) 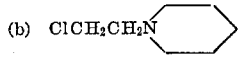<br>B.P.$_{.11}$=71° C. |

Final product isolated as hydrochloride. Yield, 67%.
M.P.=153–155° C.
Summary formula $C_{22}H_{32}O_3NCl$:
    Calculated: C=67.04%; H=8.18%.
    Found: C=66.94%; H=8.23%.

| Final Product | Prepared from—<br>(a) keto-ester component<br>(b) haloalkylamine |
|---|---|
| 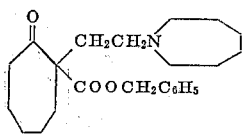 | (a) 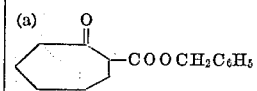<br>B.P.$_{.1}$=164–166°C.<br><br>(b) ClCH$_2$CH$_2$N 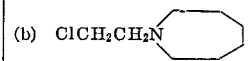<br>B.P.$_{.10}$=84–85° C. |
| Final product isolated as hydrochloride. Yield, 61%.<br>M.P.=137–138° C.<br>Summary formula C$_{23}$H$_{34}$O$_3$NCl:<br>  Calculated: C=67.71%; H=8.34%.<br>  Found: C=67.60%; H=8.51%. | |
| 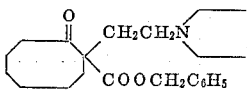 | (a) 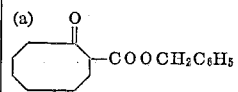<br>B.P.$_{.3}$=191–193° C.<br><br>(b) ClCH$_2$CH$_2$N 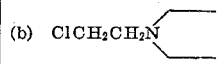<br>B.P.$_{.10}$=56° C. |
| Final product isolated as hydrochloride. Yield, 72%.<br>M.P.=161–162° C.<br>Summary formula C$_{22}$H$_{32}$O$_3$NCl:<br>  Calculated: C=67.07%; H=8.19%.<br>  Found: C=67.16%; H=8.44%. | |
| 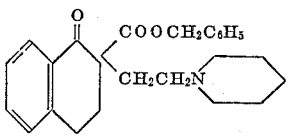 | (a) 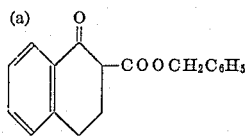<br>B.P.$_{.2}$=190–195° C.<br><br>(b) ClCH$_2$CH$_2$N 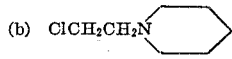<br>B.P.$_{.11}$=71° C. |
| Final product isolated as maleinate. Yield, 10%.<br>M.P.=118–119° C.<br>Summary formula C$_{29}$H$_{33}$O$_7$N:<br>  Calculated: C=68.63%; H=6.55%.<br>  Found: C=68.42%; H=6.64%. | |
| 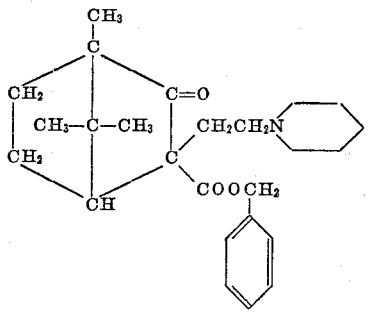 | (a) 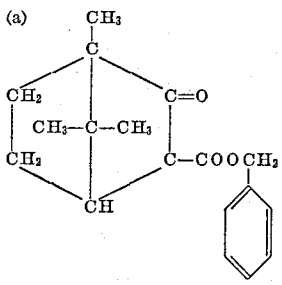<br>B.P.$_{.3}$=183–185° C.<br><br>(b) ClCH$_2$CH$_2$N 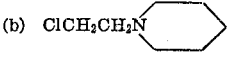<br>B.P.$_{.11}$=71° C. |
| Final product isolated as hydrochloride. Yield, 33%.<br>M.P.=174–176° C.<br>Summary formula C$_{25}$H$_{36}$O$_3$NCl:<br>  Calculated: C=69.19%; H=8.36%.<br>  Found: C=69.06%; H=8.37%. | |

| Final Product | Prepared from—<br>(a) keto-ester component<br>(b) haloalkylamine |
|---|---|
| ![structure with CH2CH2N and COOCH2-phenyl]  | 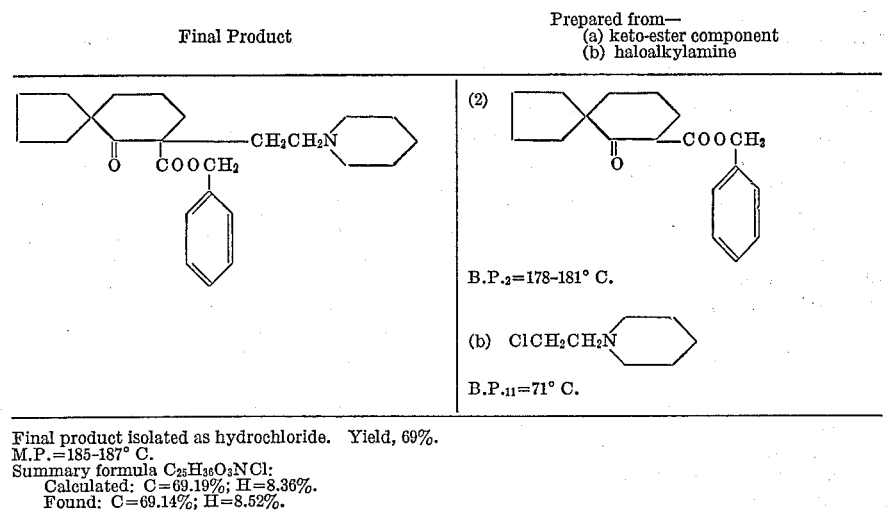 |

Final product isolated as hydrochloride. Yield, 69%.
M.P.=185–187° C.
Summary formula $C_{25}H_{36}O_3NCl$:
 Calculated: C=69.19%; H=8.36%.
 Found: C=69.14%; H=8.52%.

In an analogous manner, there are obtained other basically substituted cycloalkanone-2-carboxylic acid esters by condensation of the cycloalkanone-2-carboxylic acid benzyl ester or of other esters of said acid such as the ethyl, n-propyl, methyl, isobutyl, n-pentyl esters with basic compounds of Formula III, such as α-di-n-propylamino-n-propylchloride,
α-dimethylamino-n-propylchloride,
β-dimethylamino ethylchloride,
β-di-n-butylamino ethylchloride,
β-diethylamino isobutylchloride,
β-(2-methyl piperidino) ethylchloride (boiling point: 86–87° C./12 mm. Hg),
β-morpholino ethylbromide,
β-heptamethylene imino ethylchloride (boiling point: 99° C./10 mm. Hg),
β-(2-n-propyl hexamethylene imino) ethylchloride (boiling point: 87–88° C./2 mm. Hg),
β-octahydro isoindolino ethylchloride (boiling point: 90° C./2 mm. Hg),
β-tetrahydropyridino ethylchloride (melting point of hydrochloride: 190–220° C. with decomposition),
[trans-β-decahydroquinolino-(1)] ethylchloride (boiling point: 95–97° C./2 mm. Hg), and others.

As stated hereinabove, the new basically substituted cycloalkanone-2-carboxylic acid esters according to the present invention have a surprisingly high antitussive effect as is evident from pharmacological tests the results of which are shown in the following Table I.

The compounds were tested in a glass chamber by administering them to guinea pigs which had not been anaesthetised. The animals were induced to cough by exposing them to a 3.8% ammonia aerosol. The number of times each animal coughed was automatically recorded electrically. In each test the animals were exposed for three minutes. Only those animals were selected which in a preliminary test had reacted by coughing at least ten and not more than fifty times. Moreover, each animal was submitted to a control test before being subjected to the main test. Four hours after the control test and 1 hour after receiving the injection they were again exposed to the aerosol, the difference in the number of coughs during the two exposures being determined. The percentage inhibition of the rate of coughing was used as a measure for the activity of the tested substance. Each of the tested substances was first administered in a dosage of 0.75 mg./kg. to give a rough indication of the superiority or inferiority of the substance compared with a convention standard preparation of codeine. This dose of codeine had a 33.5% inhibiting effect on coughing. Particularly effective substances were also tested when administered in quantities of only 0.1 mg./kg.

TABLE I

| Compound | Antitussive effect | |
|---|---|---|
| | Dose in mg./kg. | Inhibition in percent |
| 2-(β-piperidinoethyl)-cycloheptanone-2-carboxylic acid benzyl ester hydrochloride | 0.75; 0.1 | 54.1; 14.5 |
| 2-(β-pyrrolidinoethyl)-cycloheptanone-2-carboxylic acid benzyl ester hydrochloride | 0.75 | 35.4 |
| 2-(β-piperidinoethyl)-cyclodecanone-2-carboxylic acid benzyl ester hydrochloride | 0.75; 0.1 | 78.7; 35.0 |
| 1-oxo-2-(β-piperidinoethyl)-1,2,3,4-tetrahydronapthalene-2-carboxylic acid benzyl ester maleinate | 0.75; 0.1 | 71.6; 31.4 |

For comparative purposes known antitussives were tested by the same method. The measured cough inhibiting effects are collated in Table II.

TABLE II

| Compound | Antitussive effect | |
|---|---|---|
| | Dose in mg./kg. | Inhibition in percent |
| Codeine | 0.75 | 33.5 |
| Narcotine | 0.75 | 36.9 |
| Codeine nicotinate | 0.75 | 46.2 |
| 1,1-diphenyl-1-dimethylaminoethyl butanone-(2)-hydrochloride | 0.75; 0.1 | 56.2; 15.8 |
| 1-o-chlorophenyl-1-phenyl-3-dimethylamino propanol-(1)-hydrochloride | 0.75; 0.1 | 48.8; 5.1 |
| (+)3-methoxy-N-methyl morphinane hydrobromide | 0.75 | 38.9 |
| Thiophenyl pyridylamino-10-piperidino ethoxy ethyl carboxylate hydrochloride | 0.75 | 31.0 |
| 1-p-chlorophenyl-2,3-dimethyl-4-dimethylamino butanol-(2)-hydrochloride | 0.75 | 27.9 |
| α-(Isopropyl)-α-(β-dimethylamino propyl) phenyl acetonitrile citrate | 0.75 | 33.0 |
| 1-p-chlorobenzohydryl-4-methyl piperazine hydrochloride | 0.75; 0.1 | 29.9; 13.0 |

These comparative tests prove clearly that the antitussive effect of most of the new basically substituted cycloalkanone carboxylic acid esters is far superior to that of the known cough remedies used in therapy inasmuch as, even when administering such a low dose as 0.1 mg./kg., an antitussive effect of more than 20% is achieved. Such a pronounced antitussive effect has not been observed with any of the commercially available cough remedies.

The pharmacological tests and administration to patients clearly prove that the new compounds are highly effective antitussive agents. Their mechanism of activity is not based on a central inhibition of the cough center as is evidenced by the absence of any analgesic activity. It is assumed that their point of attack is located in the periphery, i.e. an endo-anesthesia of the lung stretch receptors is achieved which, together with a papaverine-like spasmolytic effect, produces the clinical effect.

As has been found, the new compounds do not cause obstipation.

Testing of the new antitussive compounds for their local tolerability showed only insignificant irritation on parenteral application and no irritation of the gastric mucosa on oral application of high doses.

On plotting the time-activity curve for the new antitussive compounds by means of the aerosol test the new compounds show a pronounced superiority over the standard antitussive compound codeine not only with respect to their effectiveness but also with respect to the persistency of their antitussive effect.

In place of hydrochloric acid, other pharmaceutically acceptable, substantially non-toxic acids may be used to produce acid addition salts of the new bases, for instance, sulfuric acid, phosphoric acid, nitric acid, sulfamic acid, or organic acids such as oxalic acid, tartaric acid, malic acid, phthalic acid, nicotinic acid, benzoic acid and others. Hydrobromic acid and maleic acid, have proved to form especially useful acid addition salts.

The antitussive compounds according to the present invention or their acid addition salts may be administered orally in the solid state in the form of tablets, dragées, capsules, or the like shaped preparations, or in the form of solutions, emulsions, suspensions, and the like. Rectal administration in the form of suppositories is also possible as well as parenteral administration, for instance, of aqueous solutions of the acid addition salts by subcutaneous or intravenous injection.

When preparing tablets, dragées, pills, and the like solid shaped preparations to be used in human therapy, commonly used diluting agents, binders, lubricants, and other tableting adjuvants are employed, such as sugar, lactose, talc, starch, bolus alba; as binders, pectin, gelatin, gum arabic, methyl cellulose, yeast extract, agar, tragacanth; and as lubricants stearic acid, magnesium stearate, and others.

The content of the active compound in such preparations may vary. It is, of course, necessary that the active compound be present in such an amount that a suitable dosage will be ensured. Ordinarily dragées should not contain less than 3.0 mg. per dragée, preferably 5.0 mg., i.e. between about 5% and about 10% of the active compound.

The following examples of compositions containing the basically substituted cycloalkanone-2-carboxylic acid esters according to the present invention as they may be used in therapy serve to further illustrate the present invention without, however, limiting the same thereto.

Example 3

5 mg. of 2-(β-piperidino ethyl) cyclodecanone-2-carboxylic acid benzyl ester hydrochloride and 48.0 mg. of starch are intimately mixed. The resulting mixture is pressed into tablets which are sugar-coated to dragées, each weighing about 100 mg. Dosage: One or two dragées three times daily.

Example 4

50.0 mg. of 2-(β-piperidino ethyl) cyclodecanone-2-carboxylic acid benzyl ester hydrochloride are dissolved in distilled water. Flavoring compounds are added thereto and the solution is made up to 100 cc. Dosage: One to two teaspoons full of the solution three times daily.

Example 5

5 g. of 1-oxo-2-(β-piperidino ethyl)-1,2,3,4-tetrahydronaphthalene-2-carboxylic acid benzyl ester maleinate are dissolved in 460 cc. of water. 20 drops of the so prepared solution correspond to about 0.46 cc. and contain 5 mg. of the antitussive compound. Dosage: 20 drops three times daily.

Example 6

5 mg. of 2-(β-piperidino ethyl) cyclodecanone-2-carboxylic acid benzyl ester hydrochloride are intimately incorporated into 1 g. of a conventional suppository vehicle, for instance, theobroma oil. After homogenization, the mixture is poured into suppository molds. Dosage: One suppository in the evening before retiring.

Other compositions may be prepared in a manner well known to the art.

Of course, many changes and variations in the reaction components, the solvents used, the reaction conditions, temperature, duration, concentration of the reaction components, in the methods of working up the reaction mixture and of isolating and purifying the reaction products, in the preparation of pharmaceutical compositions containing the same, and the like, may be made by those skilled in the art in accordance with the principles set forth herein and in the claims annexed hereto.

We claim:
1. The compound selected from the group consisting of the basically substituted cyclohexanone carboxylic acid ester of the formula

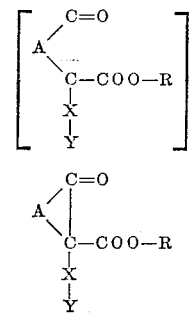

wherein
A together with the carbonyl radical and the carbon atom to which it is joined form a structure taken from the group consisting of cyclodecanone; spiro-[4.5] - decan - 6 - one; and 1-oxo-1,2,3,4-tetrahydronaphthalene;
X represents 1,2-ethylene, 1,3-propylene or 1,2-butylene;
Y is selected from the group consisting of pyrrolidino-, piperidino-, morpholino-, tetrahydropyridino-, hexamethylene-imino- and decahydroquinolino groups;
R is a benzyl group;
and pharmaceutically acceptable, substantially non-toxic acid addition salts thereof.

2. 2 - (β - piperidinoethyl)-cyclodecanone-2-carboxylic acid benzyl ester hydrochloride.

3. 1 - oxo - 2 - (β - piperidinoethyl)-1,2,3,4-tetrahydronapthalene-2-carboxylic acid benzyl ester maleinate.

4. 2 - (β - piperidinoethyl)-cyclodecanone-2-carboxylic acid benzyl ester.

5. 1 - oxo - 2 - (β - piperidinoethyl)-1,2,3,4-tetrahydronapthalene-2-carboxylic acid benzyl ester.

References Cited

UNITED STATES PATENTS 2,656,385   10/1953   Hogg et al. _____ 260—468

FOREIGN PATENTS 176,844   11/1953   Austria.
237,593   12/1964   Austria.

OTHER REFERENCES

Akkerman, Rec. Trav. Chem. vol. 72, pp. 281–128 (55)
Burger, Medicinal Chemistry, 2nd ed. (1960) Interscience, New York, p. 672.

JAMES A. PATTEN, *Primary Examiner.*